US011652654B2

(12) United States Patent
Marggraff et al.

(10) Patent No.: US 11,652,654 B2
(45) Date of Patent: May 16, 2023

(54) SYSTEMS AND METHODS TO COOPERATIVELY PERFORM VIRTUAL ACTIONS

(71) Applicant: KINOO, Inc., Mountain View, CA (US)

(72) Inventors: Lewis James Marggraff, Lafayette, CA (US); Nelson George Publicover, Bellingham, WA (US)

(73) Assignee: KINOO, INC., Mountain View, CA (US)

( * ) Notice: Subject to any disclaimer, the term of this patent is extended or adjusted under 35 U.S.C. 154(b) by 0 days.

(21) Appl. No.: 17/532,985

(22) Filed: Nov. 22, 2021

(65) Prior Publication Data

US 2023/0123893 A1    Apr. 20, 2023

Related U.S. Application Data

(60) Provisional application No. 63/257,205, filed on Oct. 19, 2021.

(51) Int. Cl.
*H04L 12/18* (2006.01)
*H04L 67/131* (2022.01)

(52) U.S. Cl.
CPC ...... *H04L 12/1822* (2013.01); *H04L 12/1831* (2013.01); *H04L 67/131* (2022.05)

(58) Field of Classification Search
CPC .. H04L 12/1822; H04L 12/1831; H04L 67/38
See application file for complete search history.

(56) References Cited

U.S. PATENT DOCUMENTS

| | | | | |
|---|---|---|---|---|
| 10,785,450 | B1* | 9/2020 | van Rensburg | H04L 65/1096 |
| 11,082,661 | B1* | 8/2021 | Pollefeys | H04N 7/152 |
| 2011/0169927 | A1* | 7/2011 | Mages | G06F 3/04815 |
| | | | | 348/51 |
| 2015/0172366 | A1* | 6/2015 | Bezos | H04L 12/66 |
| | | | | 709/217 |
| 2018/0337968 | A1* | 11/2018 | Faulkner | H04L 12/1813 |
| 2019/0052473 | A1* | 2/2019 | Soni | G09B 21/009 |
| 2021/0117573 | A1* | 4/2021 | Lewbel | H04L 12/1822 |

OTHER PUBLICATIONS

E Reader Channel, Onyx Boox Note Air screen sharing via Zoom, Mar. 21, 2021, retrieved on Aug. 23, 2022 from <URL: https://www.youtube.com/watch?v=Uzv8mfzYo5Q> (Year: 2021).*

* cited by examiner

*Primary Examiner* — John A Follansbee
*Assistant Examiner* — Raqiul A Choudhury
(74) *Attorney, Agent, or Firm* — William A. English; Vista IP Law Group LLP

(57) ABSTRACT

Systems and methods are described in which the control of virtual activities is cooperatively shared among two or more interactive users. Within selected virtual actions, an initiation component is identified that, when enacted, automatically informs one or more shared-experience users of the intent by the initiator to complete the virtual action and triggers monitoring of the shared-experience users for indications signaling agreement to proceed. When the degree of agreement meets a predetermined threshold or is judged by the initiator to be adequate, the completion component of the virtual actions is enacted on all devices. Automatic incorporation of initiation and completion components during shared activities may allow for cooperative control of virtual activities without repeated and potentially monotonous questions and responses regarding when to proceed.

26 Claims, 9 Drawing Sheets

SYSTEMS AND METHODS TO COOPERATIVELY PERFORM VIRTUAL ACTIONS

RELATED APPLICATION DATA

The present application claims benefit of co-pending provisional application Ser. No. 63/257,205, filed Oct. 19, 2021, the entire disclosure of which is expressly incorporated by reference herein.

FIELD OF THE INVENTION

The present application relates generally to systems and methods for sharing control during the performance of virtual activities by two or more users. Systems and methods utilize techniques within the fields of computer programming, motion simulation, animation, motion graphics, graphical user interfaces (GUIs), telecommunications, cognition, and human-machine interactions. Shared control of virtual actions may allow GUI designers to incorporate automated mechanisms to pace virtual activities at a rate that is acceptable to all, or at least a subset of electronic device users. Systems and methods may provide shared-experience users with intuitive and time-saving human-machine interactions to cooperatively perform virtual actions.

BACKGROUND

In recent years, the world has become increasingly reliant on sharing experiences and activities while physically separated by interacting "virtually" using a variety of telecommunications strategies and platforms. The use of collaborative design (also known as participatory design) tools, workflow management systems, webinars, computational engines for online gaming, virtual music performances, and shared whiteboards are examples of activities where two or more individuals may wish to contribute content and/or perform controlling actions in real time during shared, online experiences.

As long as individual activities performed by one shared-experience user do not alter (i.e., within an immediate time frame) one or more contributions by another user, then such shared activities may generally proceed without interruption, or significant timing or synchronizing considerations. Situations that lack such real-time dependencies (e.g., email, blog posting, online commenting) avoid repeated questioning and/or requirements to coordinate or "sync" contributions by different device users. Multiple users may contribute content and/or controlling actions generally at any time without querying all (or a subset of) users whether it is appropriate to add, alter or remove content each time displays are updated.

In some situations, a sequential order may be an explicit component of the activity itself. As an example, a predefined sequence of player activities is a component of many traditional games. Moves within the game of chess are made in a back-and-forth sequence between two players. During the playing of bridge, an order among four players (i.e., a rotational sequence in the physical world) is maintained. In these cases, moves are considered sequentially by one player at a time (i.e., during times when input by other players are not permitted), the timing of each move is under the control of the player making the move (i.e., constrained only by the rules of the particular game), and the display of a completed move may signal that a contribution by another player is expected.

In other situations, control of the timing or pacing of presenting new information may be possible only by interrupting (i.e., in a non-structured manner) a predetermined rate of presentation. For example, during pre-programmed "slide show" presentations, displays may be updated at a fixed rate or use predetermined intervals for each panel that may take into account panel content. Along similar lines, the pacing of instructional presentations by one or more online presenters is often managed without significant real-time audience feedback. Explicit feedback may be provided by various polling and/or voting methods or (implicitly) as a result of responding to topical questions. However, in the majority of instructional presentations, participant feedback is typically provided in the form of post-presentation surveys (i.e., absent any control of timing or pacing of materials in real time).

In some settings, electronic aids may be available to help control the flow or pace of newly presented materials and to address questions. So-called "classroom response systems" (CRSs), also known as audience response systems and nicknamed "clickers" (e.g., manufactured by iClicker, QClick, Qomo, Elmo) may provide convenient tools for real-time audience feedback. Clickers have become increasingly flexible as a result of wireless communications, small displays to help ensure users are aware of specific questions and arrays of distinct selection buttons. The application of clickers is generally focused on increasing audience engagement and may provide continuous, real-time assessment of the pace of presented content, as well as a convenient method for any or all members of an audience to respond to questions.

When adjusting to optimum or even simply agreeable timing during shared virtual actions, a user and/or machine-based software might ask each interacting individual whether they have had sufficient time during each step prior to moving on to a next step. Repeated asking and responding adds a number of time-consuming operations to virtual actions, and requires constant attention that rapidly becomes monotonous and distracting. New interaction paradigms are required to streamline the performing of virtual actions while accommodating different users who may prefer or require differing pacing to fully comprehend and/or perform shared activities.

SUMMARY

In view of the foregoing, systems and methods are provided herein to incorporate controlling actions of device users during real-time, shared virtual activities within the performance of the virtual actions themselves. This may be achieved by identifying components within selected virtual actions that automatically signal and/or inform other users of the intent of an initiator to complete the virtual action. Other users (i.e., "shared-experience" or "cooperative-control" users who may interact remotely) may then have the opportunity to indicate or signal agreement with the initiator to complete the virtual action. More specifically, within selected virtual actions: 1) an initiation component is labelled or identified such that, when enacted, shared-experience users are automatically informed of the intent of the initiating user to perform the virtual action, and 2) a completion component of the same virtual action is identified that is enacted and/or displayed on all cooperative-control devices when one or more criteria for completing the virtual action are met.

Criteria for completing a virtual action may include when: 1) a sufficient number of users signal agreement to complete the action, 2) a predetermined fraction of all users indicate agreement to complete the action, 3) one or more identified users (or combinations of specific users) indicate agreement to complete the action, 4) the initiating user determines a sufficient number or fraction of users have indicated agreement to complete the action, 5) the initiating user determines a selected (by the initiator) subset of users has indicated agreement to complete the action, 6) one or more supervisory individuals (i.e., with overriding control) force completion, 7) a predetermined time has elapsed (with prior agreement to proceed after a threshold elapsed time), or 8) a predetermined threshold (e.g., number or fraction of users) is met based on the action being performed (i.e., where different actions may be pre-assigned different thresholds). If there is insufficient agreement after a threshold elapsed time elapsed (with prior agreement to regress after the threshold time has elapsed) or a blocking indication by one or more shared-experience users, regions within screens of all cooperative-control devices involved with the virtual activity may automatically be reverted to their contents just prior to the enacting of the initiation component.

Steps to inform and share control of virtual actions may, as much as possible, be incorporated within the steps to enact virtual actions themselves. In other words, steps directed toward shared-experience users that are exclusively intended to signal intent and/or agreement, which are not directly involved in enacting the virtual action itself, are avoided. This approach facilitates focusing on enacting desired virtual activities by a group and less on ancillary steps to repeatedly query, track and/or poll individuals within the group whether shared-experience users can collectively progress to next steps during virtual activities. By labelling specific initiation and completion components to help communicate agreement on timing, activities may be performed without separate communication steps to pace the performance of activities.

As described in greater detail within the Detailed Description, the term "virtual action" is being used to indicate an action that does not necessarily physically exist (i.e., at the time of human interactions with an electronic device), but that is constructed by software to appear to do so. Some or all aspects of virtual actions may be made to appear on an electronic display device and may be accompanied by associated sounds, haptic feedback and/or other devices designed to stimulate the senses (e.g., flashing lights, retinal stimulation). Series of virtual actions may be enacted to perform "virtual activities". Also, as noted below, the singular forms "a," "an," and "the" include plural referents unless the context clearly dictates otherwise.

In accordance with an example, a method is provided for a plurality of humans to cooperatively perform a virtual action that includes an initiation component and a completion component, wherein the method includes providing a plurality of electronic devices, each electronic device comprising one or more processors, an output device operatively coupled to the one or more processors, and a sensor operatively coupled to the one or more processors; detecting, by a first sensor of the plurality of electronic devices, the initiation component of the virtual action by a first human; displaying, on output devices of all of the electronic devices, one or more indications of the detecting of the initiation component of the virtual action by the first human; detecting, by one or more additional sensors of the plurality of electronic devices, a number of agreeing indications to perform the virtual action; determining, by the one or more processors, that the number of agreeing indications is greater than or equal to a threshold; and displaying, on the output devices of all of the electronic devices, the completion component of the virtual action.

In accordance with another example, a method is provided for a plurality of humans to cooperatively perform a virtual action that includes an initiation component and a completion component, wherein the method includes providing a plurality of electronic devices, each electronic device comprising one or more processors, an output device operatively coupled to the one or more processors, and a sensor operatively coupled to the one or more processors; detecting, by a first sensor of the plurality of electronic devices, the initiation component of the virtual action by a first human; displaying, on output devices of all of the electronic devices, one or more indications of the detecting of the initiation component of the virtual action by the first human; detecting, by one or more additional sensors of the plurality of electronic devices, a number of agreeing indications to perform the virtual action; displaying, on an output device viewed by the first human, the number of agreeing indications to perform the virtual action; detecting, by the first sensor, a confirming indication by the first human to complete the virtual action; and displaying, on the output devices of all of the electronic devices, the completion component of the virtual action.

In accordance with yet another example, a method is provided for a plurality of humans to cooperatively perform a virtual action that includes an initiation component and a completion component, wherein the method includes providing a plurality of electronic devices, each electronic device comprising one or more processors, an output device operatively coupled to the one or more processors, and a sensor operatively coupled to the one or more processors; detecting, by a first sensor of the plurality of electronic devices, the initiation component of the virtual action by a first human; displaying, on output devices of all of the electronic devices, one or more indications of the detecting of the initiation component of the virtual action by the first human; detecting, by one or more additional sensors of the plurality of electronic devices, a number of agreeing indications to perform the virtual action; displaying, on agreeing output devices viewed by agreeing humans, the completion component of the virtual action; determining, by the one or more processors, that the number of agreeing indications is greater than or equal to a threshold; and displaying, on the output devices of all of the electronic devices, the completion component of the virtual action.

Other aspects and features including the need for and use of the present invention will become apparent from consideration of the following description taken in conjunction with the accompanying drawings.

BRIEF DESCRIPTION OF THE DRAWINGS

A more complete understanding may be derived by referring to the Detailed Description when considered in connection with the following illustrative figures. In the figures, like-reference numbers refer to like-elements or acts throughout the figures. Presented examples are illustrated in the accompanying drawings, in which.

DETAILED DESCRIPTION

Figure 1:
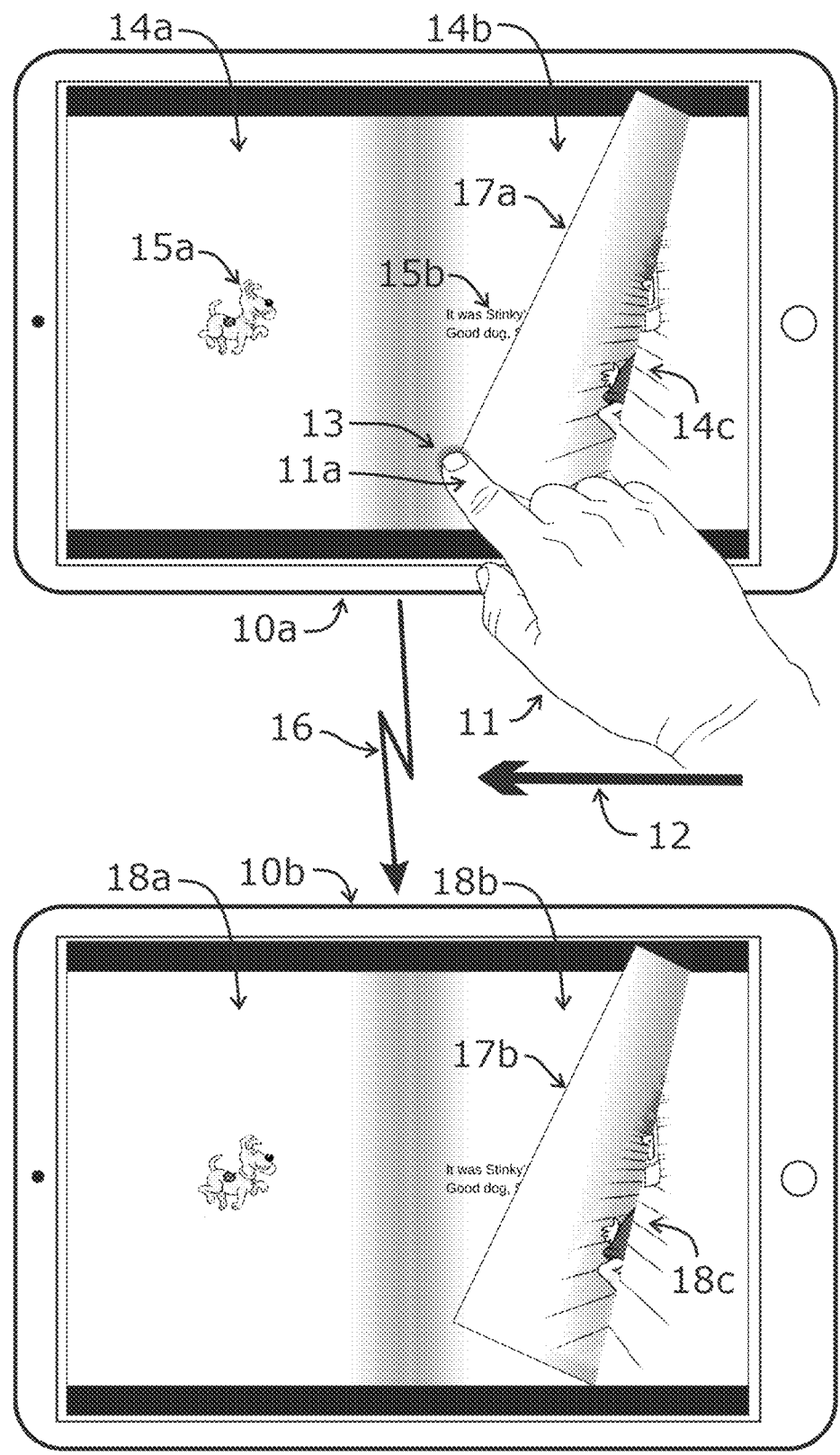
FIG. 1 demonstrates how enacting an initiation component of a virtual action (i.e., initiating the turning of a book page) by one device user (i.e., an initiator) may be signalled to one or more shared-experience users.

Before the examples are described, it is to be understood that the invention is not limited to particular examples described herein, as such may, of course, vary. It is also to be understood that the terminology used herein is for the purpose of describing particular examples only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Also within descriptions herein, the term "virtual action" is being used to indicate an action that does not necessarily physically exist (i.e., at the time of human interactions with an electronic device), but that is constructed by software to appear to do so. Software (that may also direct firmware and hardware components) may computationally construct and compute movements (i.e., evolving over time) of virtual action elements. Virtual actions may involve object and/or movement elements that are familiar to most individuals (e.g., tools, plants, bouncing balls), elements that may be familiar to some (e.g., recognizable actors, identifiable birds, explosions) and/or elements that cannot exist in the real world (e.g., fantastical characters, avatars, supernatural behaviors). At some times, not all aspects of a virtual action may be made to appear on one or more electronic display devices, for example, because of being hidden within a particular viewing perspective, obscured by another (virtual) object, aspects evolving over time, and so on. Clusters of virtual actions may be enacted by one or more individuals within series to perform "virtual activities".

Virtual actions may be displayed on one or more electronic devices including one or more display screens, touch-sensitive screens, projection devices, projection devices that integrate the ability to specify locations on the display surface, holographic displays, head-up displays, electronic billboards, television monitors, augmented reality displays, virtual reality displays, augmented reality contact lenses, paper-based multimedia, and so on. Such displays may be components of electronic devices such as tablets, mobile phones, laptop computers, desktop computers, smart televisions, virtual reality headsets, augmented reality headsets, augmented reality eye implants, and so on.

An aspect of the systems and methods herein includes the labelling of: 1) an initiation component and 2) a completion component within selected virtual actions. Enacting an initiation component of a virtual action by an initiator results in one or more processors (i.e., automatically) signalling all cooperative-control devices of an intent by the initiator to proceed toward the completion component of the virtual action, and monitoring for indications of agreement by shared-experience users to complete the virtual action. In most applications, when the number of agreeing indications meets or exceeds pre-established criteria, the completion component of the virtual actions is automatically enacted on all cooperative-control devices, allowing all users to collectively move on to a subsequent activity (e.g., a new virtual action). By identifying components to automatically communicate agreement on timing, a virtual activity may generally be performed without a need to include separate communication steps to pause, move forward or pace the performance of activities.

From the perspective of shared-experience users, the cooperative control of a virtual action may include the following steps:

1. enact an initiation component of the virtual action by an initiator, indicating a desire by the initiator to proceed to the completion component;
2. automatically indicate to all cooperative-control users that an initiation component has been enacted;
3. provide an opportunity for each cooperative-control user to indicate agreement and/or disagreement to proceed to the completion component of the virtual action;
4. optionally display the completion component to the initiator and/or to each cooperative-control user immediately upon indicating agreement to proceed;
5. optionally provide real-time measures of the degree of agreement to the initiator, a subset of users or all users;
6. upon reaching a predetermined threshold number of agreeing shared-experience users or a forcing indication from one or more users (including the initiator), enact the completion component of the virtual action on all devices;
7. if the number of users agreeing to enact the completion component does not reach the predetermined threshold within a predetermined time (with prior agreement to proceed after a threshold elapsed time) or a forcing indication by one or more users is detected, enact the completion component of the virtual action on all devices; and 8. if there is insufficient agreement after a threshold elapsed time elapsed (with prior agreement to regress after the threshold time has elapsed) or a blocking indication by one or more users is detected, revert screen contents associated with the virtual action back to that displayed just prior to enacting the initiation component on all devices.

Initiation components involving touch screen contact may signal intent and trigger the process of acquiring signals to monitor for agreement by 1) initiating touch on a screen, 2) maintaining touch on a screen, or 3) withdrawing from touching a screen. For example, looking for agreement concerning when to turn a book page may begin immediately upon the initiator touching the corner of a virtual page to be turned. In this case, even while sensing for indications of agreement, the initiator may continue to move the page about (i.e., displayed on all devices) in order to attract attention to the desire to turn the page and seek agreement. As an example of maintaining touch on a screen while seeking agreement, an initiator may position a virtual nail at various locations during a virtual construction project. Briefly holding the position of the nail may be used as a signal to query whether there is agreement on the location of the nail (where agreement may be indicated by starting to virtually hammer the nail and a completion component may comprise fully inserting the nail into the virtual board). As an example of the latter case, withdrawing one or more fingers from a touch-sensitive screen may be used to initiate a search for indications of agreement after moving a token or piece about within a virtual puzzle. Upon withdrawal, one or more indications may be sent to shared-experience users signalling the beginning of a time when agreement regarding token placement may be registered.

Similar timing and signalling actions may be performed using a variety of input devices capable of indicating location, including by different cooperative-control users and/or using different input devices at different times, for example, a stylus contacting any location-sensing surface, a computer mouse within most traditional computer setups (e.g., with button-down and button-up states equivalent to initiating touch and withdrawing from touch on a screen respectively, as described above), "touching" a virtual screen within a virtual reality or augmented reality environment, eye tracking to indicate location along with sensing eye blink or other muscle movements for signalling (e.g., particularly within assistive setups), and so on.

Within further examples, a variety of methods may be used to indicate to shared-experience users that an initiator has enacted an initiation component, signaling a desire to perform a virtual action and triggering a period during which shared-experience users may indicate agreement to complete the action. An indication likely to be intuitive to most shared-experience users may be simply displaying the same initiation component just enacted by the initiator. Displaying the initiation component facilitates enacting a completion component by any cooperative-control user to signal agreement and directly transitioning to the display of a completed virtual action.

Alternatively or in addition, a variety of visual, auditory and/or haptic methods may be used to signal to shared-experience users, the beginning of a period during which agreement to complete the virtual action may be indicated. Visual cues may, for example, include one or more of a superimposed symbol (e.g., crosshair, star-burst), text, change in color or luminance of one or more involved virtual objects, adjustment of the hue or contrast of one or more objects, inserting one or more "fuzzy" screen regions (e.g., indicating touchable locations for a finger), adding one or more pointers to direct attention toward an involved virtual object, enacting one or more time-varying (e.g., flashing) display components, creating a visual "vibration" or other movement (e.g., translational, rotational) of an object, an animation (e.g., pointing to or illustrating consequences of enacting the virtual action), adding or changing a border around an involved object, changing the size and/or appearance of an object, and so on. Involved virtual objects may include those used to enact the virtual action, objects modified by the action, erased as a result of the action, hidden as a result of the action, tools used to enact the action, and so on.

Within further initiation component signalling examples, auditory cues may stand alone or be a component to augment visual and/or haptic prompts. Auditory signalling may range from a simple beep or tone, to instructional clips accompanying a visual sequence. Auditory and/or haptic cues may avoid a need to modify visual displays (e.g., avoiding superimposed visual cues that may hide aspects of a virtual activity). Repeated use of specific visual, auditory and/or haptic cues under repetitive or frequently encountered conditions may be used to signal or "condition" shared-experience users regarding the type of virtual action (and associated agreement reactions). For example, a "ding" sound may accompany the initiation of each page turn within a book while a "look here" sound may be broadcast each time a virtual action is initiated involving a virtual interaction with a character in the book.

Any time after becoming aware of the intent by an initiator to proceed to the completion component of a virtual action, the one or more shared-experience users may generate agreeing indications, signalling agreement to proceed to the completion component. Signaling agreement may comprise directly enacting the completion component. Alternatively, signalling may, for example, include generating a predetermined gesture (e.g., waiving a hand or finger, detected using a camera), touching either a physical or virtual pushbutton (or other screen target), sensing the pointing of one or more fingers (or other body parts) on a projected display, touching a touch-sensitive screen in an identifiable manner (e.g., rapid single touch, double touch separated by a brief interval), generating an identifiable sound (keyword or interjection, detected using a microphone), and so on.

Executing the completion component may be performed (by the one or more processors) upon meeting one or more criteria including: 1) when a threshold number of participants agree to complete the action, 2) when a predetermined fraction of all participants indicate agreement to complete the action, 3) when one or more identified users (or combination of specific users) indicate agreement to complete the action, 4) when the initiator, based on agreement feedback from shared-experience users, triggers the completion component, 5) when the initiating user determines a selected (by the initiator) subset of users has indicated agreement to complete the action, 6) when one or more supervisory individuals (i.e., with overriding control) force completion, 7) when a predetermined time has elapsed (with prior agreement to proceed after a threshold elapsed time), or 8) when a predetermined threshold (e.g., number or fraction of users) is met based on the action being performed (i.e., where different actions may be pre-assigned different thresholds). Within further examples, one or more shared-experience users may be informed of the number and/or identity of those who agree to move on to the next virtual activity. Indicating a number of individuals wishing to proceed and/or identifying those who agree may be provided: 1) only to the initiator of the virtual action, 2) to all connected devices, or 3) to a subset of all users and/or observers (e.g., monitors, supervisors) where such subsets may vary with particular virtual actions, and/or following actions initiated by different users and/or at differing times. Such indications may be superimposed on displays that include the virtual action and/or indicated using one or more devices that are separate from those involved in shared virtual activities.

Such indications of a degree of agreement to proceed may be performed using a range of informational strategies. As examples, a number of agreeing indications (optionally including a total number of devices connected) may be indicated in which the number may be represented numerically, as one or more check-boxes (particularly when a small number of devices are connected), in graphical form (e.g., as a pie chart or thermometer representation), as a symbol that flashes or moves as each agreement is registered (and/or that may grow in size as the number of agreeing indications grows), and so on.

Within further examples, the identities of those agreeing to complete a virtual action may be revealed only to the initiator of the virtual action, to all connected devices, or to a subset of users where subsets may vary with particular virtual actions, following actions initiated by different users or at different times (e.g., different interactive sessions). Identities may be provided using a range of formats including: 1) listing names and/or nicknames of agreeing (or, alternatively, not yet agreeing) individuals, 2) representing individuals (or groups of individuals) by avatars, emojis, graphical representations (e.g., cartoon-like characters) or other symbolic representations, 3) displaying photographic images (e.g., recorded at the time of agreement) of individuals and/or their surroundings, and/or 4) displaying video (e.g., including live streaming) of agreeing (or, alternatively, not yet agreeing) individuals.

Indications of numbers of agreeing individuals and/or their identities may be superimposed on the one or more devices used to cooperatively perform virtual actions. For example, so-called thumbnail representations may be displayed and/or a dynamically updated region of a screen (e.g., vertical scroll, pop-down, ticker-tape display) may be devoted to such information. Alternatively or in addition, separate display devices may be utilized so as to not interfere with displays involved in performing cooperative virtual activities. Such secondary displays may be employed in classrooms, medical facilities or other settings where primary display devices might risk being viewed by one or more individuals to whom such information may be restricted.

Agreement to proceed may, alternatively or in addition, be indicated in an audio form (e.g., using speech synthesis). Counts of the number of agreeing individuals may be provided periodically, a chime or other sound may be generated as agreements are signaled, the names (or nicknames) of those in agreement may be enunciated (e.g., in order of agreement), and so on. Audio indications of cooperative agreement while performing shared virtual actions may convey degrees of agreement while avoiding modification of displayed content while performing shared activities.

At any time, any user (including an initiator) may perform any number of non-signalling virtual actions (i.e., neither an initiation component nor agreeing indication). This includes during times 1) after receiving an initiation indication but before producing and agreeing indication, or 2) after producing an agreeing indication but before a completion component is enacted (e.g., during a time when an insufficient number of other users have indicated agreement to proceed to the completion component). A non-signalling action may be 1) imposed or required prior to enacting a signalling indication, or 2) not required, but simply allowed to be enacted at any time. Such non-signalling virtual activities may affect only the display of the individual performing the action (e.g., within a "personal" area of a display device) or be immediately shared with one or more other users (e.g., within a "shared" area of display devices. By contrast, virtual actions labelled with an initiation component and an associated completion component (i.e., signalling virtual actions) are used to cooperatively pace activities, as described herein.

As an example that illustrates the inclusion of a non-signalling component of a virtual action, consider a shared experience of opening a virtual door. Knocking on the virtual door or ringing a virtual doorbell by one user (i.e., an initiator) may be considered an initiating component used to signal all shared-experience users of a desire to open the door. An agreeing indication may be to push on the door, and the completion component of this action may be to completely open the virtual door. However, an intermediate step may be imposed on one or more of the users to turn a virtual doorknob in order to reach a state where the door may be pushed open.

Within further exemplary virtual activities, multiple intermediate (i.e., non-signalling) steps may be imposed. During the door-opening example just described, typing a door-opening code and inserting a virtual key may be required, non-signalling steps prior to allowing the door to be pushed open.

Additionally, the number of intermediate (i.e., non-signalling) steps may be variable during particular activities and/or for each user. For example, when screwing a virtual screw into a board, the placement of the screw (e.g., using a touch-sensitive display) on the virtual board may be viewed as an initiation component. Each user may then use rotational movements (e.g., using screen-touch gestures or by moving a handheld controller) to turn the virtual screw. The degree to which each turn of the virtual screw inserts the screw into the board may be dependent on the degree of rotation during each screw-turning gesture or movement. Thus, the number of gestures to completely turn the screw into the virtual board may be variable. Once the screw can no longer be rotated (i.e., unable to penetrate through a virtual board) this agreeing indication may be signalled to others to indicate a time to move on to the completion component (e.g., firmly affixing the board within the construction project).

Within exemplary applications, a particularly intuitive implementation of cooperative control may arise when 1) a graphic representation of the initiation component itself is used to signal the intent of the initiator, and/or 2) the agreeing indication and the completion component of the virtual action are one and the same. In such cases, an initiator may initiate a virtual action that is simply completed by one or more cooperative-control users. Once the one or more criteria for agreement to proceed are achieved, the initiator views a completed virtual action (i.e., requiring no completion component or further interaction). Conversely, the one or more shared-experience users may view a resultant completed virtual action simply upon enacting the completion component (i.e., requiring no initiation component or further interaction). This scheme allows any shared-experience user to control the timing of an individual virtual action or to pace a series of virtual actions with a minimal number of interactions or back-and-forth questioning regarding when to proceed.

Within further examples, labelling the initiation and/or completion components of virtual actions may be applied: 1) to general classes of virtual actions and/or 2) to specific virtual actions. Labelling may also be performed: 1) prior to performing virtual actions (i.e., predetermined) and/or 2) as virtual interactions are taking place. As an example of a class of virtual actions that may be pre-established prior to performing virtual activities, the turning of book pages is a well-structured activity that may be performed using any book (pamphlet, newspaper, etc.) containing a traditional page structure. Thus, page-turning of virtual books may be performed within a general class of virtual actions using pre-established motions and prompts where, for example, touching a page corner may be the initiating component and completing the page turn may be the completion component. Similar strategies may be used to advance panels within traditional forms of presentations (e.g., slideshows) or connected series of webpages.

On the other hand, the shared construction of a virtual object (e.g. dollhouse) may require a number of shared steps involving disparate actions. Virtual motions for placing components (e.g., boards, windows, shingles), turning virtual clamps or hammering virtual nails may involve motions that are distinct from each other within the overall virtual activity, and it may not be feasible or of interest to an initiator to pre-establish initiation and completion components for every possible form of virtual action. In these cases, it may be preferable to identify initiation components (i.e., that trigger an agreement query) and completion components during the process of being enacted by the initiator.

Identifying (i.e., labelling) initiation and completion components by the initiator may be performed using a range of indications including push buttons (real or virtual), distinctive motions or gestures, generated sound (i.e., one or more keywords such as "initiation" or "completion" detected using a microphone), and so on. Separate indications may be used to indicate when an initiation versus completion component is being enacted (e.g., separate push buttons, distinctive words). Brief pauses in motion may be used to separate components. If only a single indication is utilized, the order (e.g., initiation first followed by completion component) and/or characteristics of the indication (e.g., repeated button presses or screen touches throughout enacting the component) may be used to distinguish initiation versus completion components.

A convenient method to label initiation and/or completion components of a virtual action during the process of performing the virtual action may be via bimanual control. In this case, the virtual action may be performed in a typical fashion (i.e., without interruption, generally using a dominant hand to enact a virtual action, for example, via a touch-sensitive screen) and an indicator that identifies the action as initiation or completion component may be signalled during the performing of the action using the opposing hand (i.e., generally a non-dominant hand). Such labelling or signalling using the opposing hand may, for example, be performed by a handheld controller via one or more controller buttons, motion gestures, pointing at one or more predetermined locations, and so on. Systems and methods for bimanual control are described in more detail in co-pending application Ser. No. 17/396,643, filed Aug. 6, 2021, the entire disclosure of which is expressly incorporated by reference herein.

The substantially simultaneous use of two hands to manipulate a virtual environment and/or to signal initiation or completion components (e.g., via one or more pushbuttons) may include two or more hands of distinct individuals (i.e., where "bimanual" control is not limited to the two hands of a single individual). Users may, for example, be separated by some distance using one or more processors operatively coupled using one or more telecommunications methods. During such cooperative activities, one user may label and/or perform an initiating component of a virtual action (e.g., by pointing to a location on a touch-sensitive screen to specify an object involved with the virtual action) that is subsequently enacted upon by a second user (e.g., performing a non-signaling interaction, labelling indication and/or completing action, for example, using a handheld controller).

Within an exemplary collective activity, one user may point to a virtual nail (i.e., labelling and/or initiating the virtual action) followed by a second user hammering the nail enacted by virtually mimicking movements of a handheld controller (i.e., labelling and/or completing the virtual action). Completion of the virtual action may then be used to signal to all users a transition to a new action or activity. Systems and methods for manual control involving two users who may be separated by some distance are described in more detail in co-pending application Ser. No. 17/531,571, filed Nov. 19, 2021, the entire disclosure of which is expressly incorporated by reference herein.

Additional exemplary virtual actions include turning a virtual book page, displaying a new image within a series of images, adding a component to a virtual object, removing a component from a virtual object, changing the location of a virtual object, moving to a new viewing location within a virtual environment, adding one or more words to a document, removing one or more words from a document, adding one or more images to a presentation, removing one or more images from a presentation, adding a note to a musical score, removing a note from a musical score, adding an instruction to a set of instructions, removing an instruction from a set of instructions, and so on.

Virtual actions are not limited to those that might have an equivalent physical or visual form in the real world. As mentioned previously, virtual objects may be fantastical. One or more goals of a virtual activity may include those that stimulate (or are perceived as having the potential to stimulate) any of the senses including taste, smell and/or hearing. Within an exemplary case of "building" a virtual cake, agreeing to which ingredients to use, when to add each ingredient and how to bake and assemble mixtures may all employ shared considerations with a goal of constructing a cake that might have a pleasing taste to most users. Similarly, the composing of a musical piece may be enacted via cooperative virtual actions using a musical score as a visual tool, but with an ultimate goal of creating a pleasing audio experience.

The above descriptions relate to typical and/or common configurations of device users. However, in some scenarios, it may be useful to designate one or more users as having increased control over the pace and/or progression of enacting virtual activities. Equivalently, this may be viewed as designating one or more users as having lesser abilities to control advancement during cooperative virtual actions. Such gradations in abilities to control steps while advancing virtual actions may arise, for example, when a parent or guardian shares a virtual activity with one or more children (i.e., where the guardian has increased control over activities), or when a teacher provide instruction within a virtual classroom setting (i.e., the instructor may override predetermined thresholds including circumventing a lack of and/or inappropriate audience responses).

Gradations in the ability of designated users to control abilities to initiate and/or complete virtual actions may be enacted by controlling virtual activity steps in which: 1) only designated users may be allowed to be the initiator of a virtual action (e.g., a presenter indicating a desire to advance to the next panel during an audience presentation), and/or 2) only designated users are allowed to signal agreement to complete the virtual action (e.g., effectively dividing an audience into active participants versus passive viewers).

Within additional examples, one or more designated users may be permitted to "block" the progressions of virtual activities either temporarily (e.g., to take a brief pause from virtual interactions to perform other tasks) or indefinitely (e.g., to counteract inappropriate interactions). The same or a separate set of one or more users may be permitted to "unblock" previously blocked virtual activities.

Along similar lines, one or more designated users may be permitted to prematurely advance (i.e., "force") one or more virtual actions (e.g., without meeting pre-established threshold criteria and/or confirmation by an initiator to proceed to the completion component). The same or a separate set of one or more users may be permitted to halt such skipping of agreement steps. One or more designated users may also be given an ability to "undo" one or more virtual actions, allowing virtual actions to be repeated (i.e., without having to re-establish the framework to repeat the action within a new virtual action).

One or more users may also designate minimum and/or maximum times for display of the one or more components of a virtual action. For example, if an initiator and an agreeing user quickly step through a virtual action (i.e., with a threshold set at one agreeing user to advance to completion components), a minimum interaction time may be established to permit other users to at least follow virtual activities as actions are quickly enacted. On the other hand, if a virtual action is initiated and receives insufficient agreement over a prolonged period to move on to the completion component, the completion component may be enacted after a predetermined time (e.g., a so-called "timeout" condition). As an example, during a construction project, intermediate (i.e., non-signaling) actions may be required prior to enacting an agreeing indication. When a threshold time is reached without encountering an agreeing indication, the completion component (e.g., assembling a construction element) may be automatically enacted for all users.

Alternatively, pre-established conditions may be established to return regions of all displays associated with the virtual action to their state(s) prior to enacting the initiation component (e.g., a so-called "reset" condition) if an initiated virtual action receives insufficient agreement beyond a threshold elapsed time (i.e., since enacting the initiation component). As an example, an instructional initiation component that requires responses (e.g., answers) from a sufficient portion of an audience as agreeing steps, the one or more processors may automatically reset displays to content prior to the initiation component to allow teachings and/or instructions to be reviewed.

In further examples, GUIs may be designed to maintain interactive continuity during situations that are dependent on input from one or more users who might be absent (for brief or prolonged periods) from the interaction. This may be enacted by anticipating responses based on prior knowledge (e.g., user profiles, general preferences) and/or previous responses during similar situations. "Surrogate interactions" (i.e., generated by one or more processors) may be substituted to enact initiation components and/or agreeing steps during cooperative virtual actions.

Within examples of such surrogate interaction scenarios, systems and methods to maintain interactive continuity (i.e., "time sharing") during virtual activities are described more fully in U.S. Pat. No. 10,915,814, filed Jun. 15, 2020, the entire disclosure of which is expressly incorporated by reference herein. Within further examples of maintaining interactive continuity, systems and methods to "time shift" interactions based on anticipated or future conditions (i.e., "conditional responses") are described in U.S. Pat. No. 10,963,816, filed Oct. 23, 2020, the entire disclosure of which is expressly incorporated by reference herein. Both "time-shared" and "time-shifted" virtual actions may use an artificial intelligence (AI), which may include an AI personality (AIP), to enact and/or agree to virtual actions as a substitute or stand-in for real human interactions.

More generally, if one or more humans are unable to participate in a virtual interaction session (e.g., unavailable at a particular time), an anticipated response (e.g., from a database of potential responses), AI or AIP may stand in as a substitute or surrogate, interacting at a rate and in a manner (i.e., particularly the timing of enacting agreeing steps) that aligns with the abilities and interests of the one or more (absent) humans. The AI-based surrogate may react within virtual actions at a pace that is dependent on topic area (e.g., science, art, entertainment), educational level of the human, perceived level of difficulty (e.g., cooperatively playing music or constructing a virtual structure), whether actions have been performed previously, preferences articulated to the AI, and so on. Subsequent review of the resultant virtual activities that included surrogate participation may, as a result, be paced at a rate suited for the one or more (initially absent) individuals.

In addition, systems and methods to assess and enhance both emotional and cognitive engagement during instructional activities are described in co-pending application Ser. No. 17/200,722, filed Mar. 12, 2021, the entire disclosure of which is expressly incorporated by reference herein. By considering the presentation of an instructional element as an initiation component of a virtual action, understanding (that, as described, may be determined using neural network-based classification approaches) as an agreeing step and moving on to the next instructional topic as a completion component, many of the strategies for controlling pacing described herein may be applied. Minimizing effort and attention devoted by both purveyors and recipients of instruction to the process of assessing understanding and pacing of instructional topics may help to maintain elevated levels of engagement.

Within further related disclosures, co-pending application Ser. No. 17/233,473, filed Apr. 17, 2021, the entire disclosure of which is expressly incorporated by reference herein, describes pausing digital media presentations based on an assessment of digital content, including using AI-based classifications of content. Such pausing of digital content may be viewed as an initiation component of a virtual action and restarting content as a completion component. Pacing of the interrupted digital content may be controlled by agreeing steps (enacted by humans and/or surrogates) as described herein.

FIGS. 1, 2, 3, 4 and 9 illustrate various aspects of cooperative controls during the exemplary virtual activity of reading a book. This shared virtual activity may, for example, be performed by a parent or guardian with a remotely connected child who might be just learning to read. During shared control within this activity, an issue that arises concerns who has ultimate control to turn pages. If the adult performs most reading and then turns each page upon reaching a final sentence within the page, the child may not have an opportunity to fully appreciate page content (e.g., sentences, images). On the other hand, if the child controls page turns, it may be impossible for the adult to complete the reading of all content, and/or describe images or related experiences. If the adult (or child) repeatedly requests whether sufficient time has elapsed before turning each page, such persistent questioning and answering may easily become monotonous and/or distracting.

Picking a page corner and/or beginning to turn a virtual page may be used as a signalling indication by the adult regarding an intent or desire to turn to the next page (i.e., initiation component). The child, either immediately or after some time, may then react by completing the turning of the virtual page. The act of completing the page turn (or any other agreement signalling action) results in a page-turn displayed on all connected devices (i.e., completion component). Alternatively (e.g., if the adult desires more control over page-turning), the signalling act of attempting to complete the turning of a virtual page by the child may be relayed to the adult who then may make a decision when to complete the page-turning virtual action.

FIG. 1 demonstrates how launching an initiation component of a virtual action by a device user (i.e., the initiator) may be conveyed to one or more shared-experience users while reading a virtual book. The activity comprises turning pages 14a, 14b of a child's book containing both images 15a and text 15b. A semi-transparent disk (e.g., approximately the size of the tip of a finger) is displayed to draw attention and signal that an edge 13 of a page may be virtually picked up to initiate a page turn. The page turn was initiated by touching the right-most edge of a page at 17a using the index finger 11a of the initiator's right hand 11 and moving the touch location at 13 (i.e., pointed to by the index finger 11a) to the left 12, exposing a portion of the next page 14c (i.e., revealing a peek view).

The tablet screen 10a in the upper portion of FIG. 1 shows the enacting of the initiation component of the virtual action (i.e., page turning). At substantially the same time, a second tablet 10b connected via one or more telecommunications links 16 displays content that may be viewed by the one or more remote, shared-experience users. Additional devices (not shown) may also be interconnected, displaying content similar to that shown in the lower portion of FIG. 1.

In FIG. 1, the desire by the initiator to move on to the next page is indicated to the one or more shared-experience users by replicating on the remote device(s) 10b, the initiation component of the virtual action (i.e., an initial step to turn pages 18a, 18b). Similar to the display of the initiator 17a, the page to be turned is curled to the left 17b, partially revealing the next page 18c within the book. This substantial movement of the edge of the page 17b is designed to attract attention of shared-experience users (i.e., indicating the initiator's desire to move on).

Figure 2:
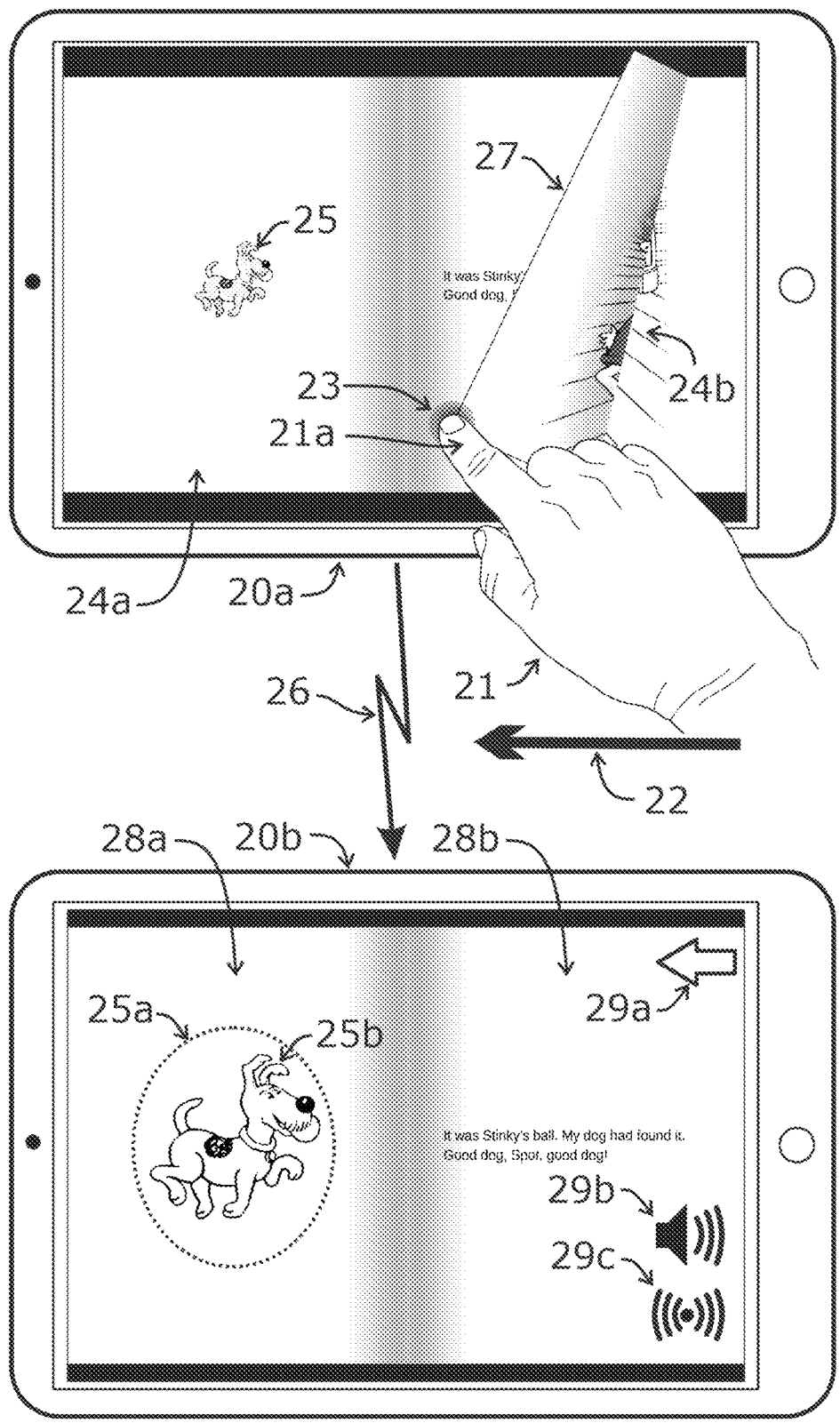
FIG. 2 shows exemplary methods (alternatively, or in addition to displaying the initiation action) to inform one or more shared-experience users that the initiation component of a virtual action has been enacted by an initiator.

FIG. 2 illustrates additional examples of methods to alert and/or inform one or more shared-experience users that an initiation component has been enacted during page-turning activities while reading a virtual book. Similar to sequence shown in FIG. 1, a page turn was initiated using an index finger 21a of the initiator's right hand 21 to pick up a page edge 27 in order to advance from a previously viewed page 24a to the next page 24b within the book. The page turn was initiated by swiping a touch location 23 of the index finger 21a to the left 22 on the initiator's display device 20a. Detection and identification of the initiation component for a page-turn virtual action is transmitted 26 to the display devices of all other users 20b (any additional remote user devices not shown).

Within the one or more pages 28a, 28b on electronic devices 20b viewed by shared-experience users, an arrow 29a is superimposed on the contents of a viewed page 28b pointing in the direction of the page turn, signaling enactment of the page-turn initiation component by the initiator. Such visual prompts may be placed repeatedly at one or more known (i.e., anticipated by the user) locations (e.g., upper right corner of the display, as shown) or in varying locations selected, for example, so as to not interfere with displayed content. Along similar lines, one or more touch locations 29b (similar to that shown to enact the initiation component at 23) may be superimposed on displays to not only indicate the enacting of an initiation component, but also to draw attention to one or more locations that may be starting points to enact agreeing signals (that may also act as completion components).

Alternatively or in addition, a sound or audio prompt 29c may be used to indicate the initiation of an action (e.g., particularly if completion of the virtual action is routine and/or obvious). Such audio cues avoid disrupting any aspect of displayed pages 28a, 28b and may be repeated at intervals to remind shared-experience users that a completion component of a virtual action is pending. Along similar lines, haptic vibration 29d generated within the display device and/or other nearby devices may be used to signal the initiation of a virtual action (i.e., without altering the display).

As previously described, the agreeing signalling and/or completion component of a virtual action may involve one or more affected virtual objects. For example, in FIG. 2, the dog 25 being covered up as a result of the page turn may be a key element of the story. An agreeing action for the page-turn may be to move and/or "copy" the (virtual) dog so that it might be re-introduced later in the story. A wide variety of visual cues may alert shared-experience users of a virtual action involving a specific object. Exemplary indicators in FIG. 2 include drawing a border 25a (i.e., dashed line oval) around the object, enlarging the object (i.e., comparing 25 with 25b) and/or making it visually stand out 25b (e.g., brighter, higher contrast).

Figure 3:
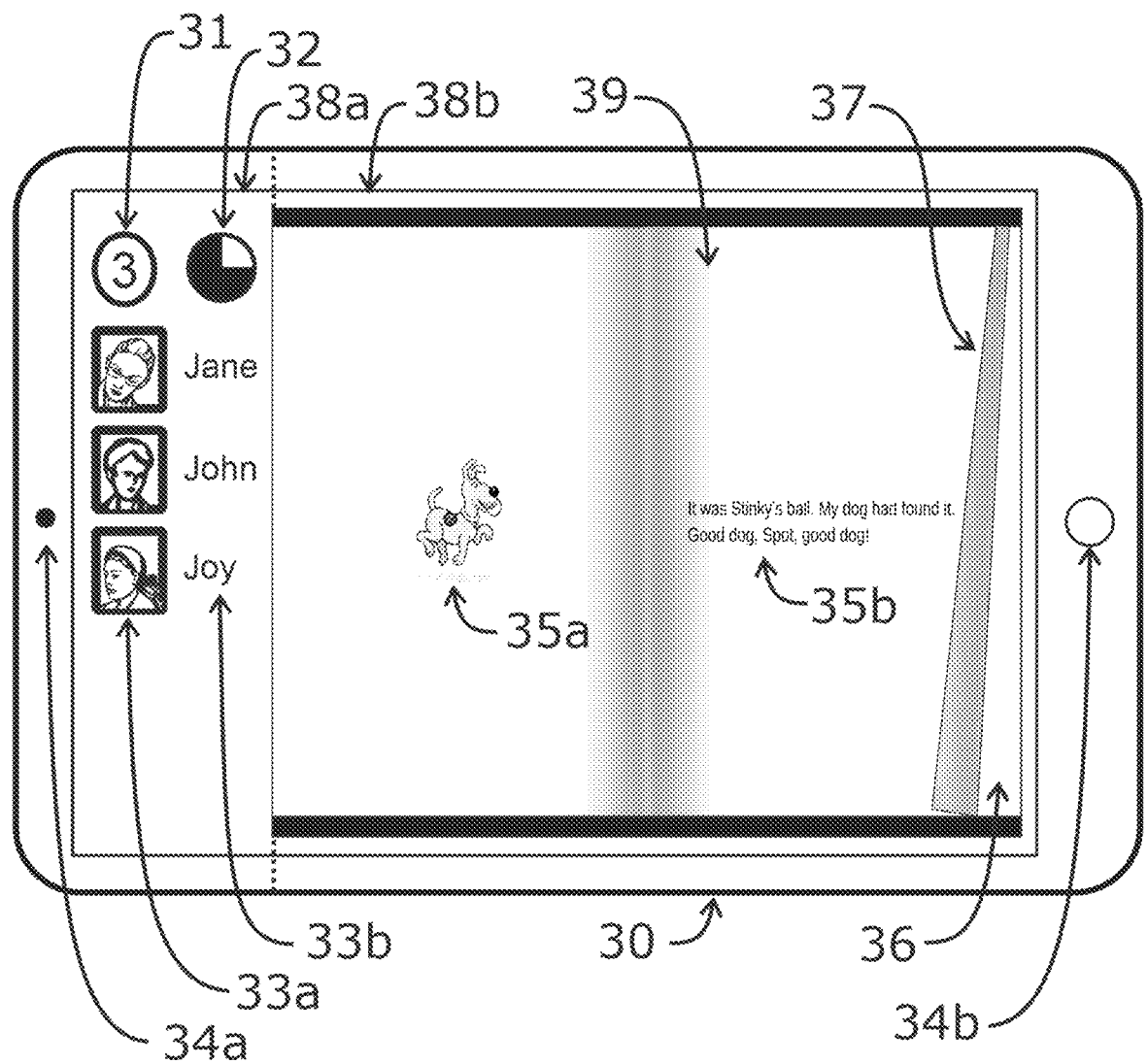
FIG. 3 illustrates monitoring the degree of agreement among shared-experience users, optionally including their identities, to help an initiator decide when to enact the completion component of a virtual action (i.e., turning a book page).

FIG. 3 illustrates various methods to monitor degree of agreement among shared-experience users to help an initiator of an action, all users, or a subset of users decide when to complete the virtual action (i.e., turning the page). In this exemplary case, a dedicated display area (i.e., left side at 38a) has been set aside to display monitoring information. This monitoring area 38a was created by shrinking in the horizontal dimension the area devoted to the display of the virtual book 38b. Alternatively, monitoring information could have been superimposed on the one or more book pages 39 or displayed on a second screen (not shown), avoiding the necessity of shrinking the area of the screen devoted to images of the book.

Monitoring information includes a number of individuals at 31 (i.e., three) agreeing (or, alternatively, not yet agreeing) to complete the virtual action. This value as a fraction of the total number of shared-experience users is also displayed graphically, as a pie chart at 32. Further, the identities of the individuals are displayed as thumbnail images (or live video streams) 33a and corresponding names (or nicknames) are displayed to the right 33b of each image. Using tablet devices and if needed, user identities may be verified on remote devices visually (e.g., using a device camera 34a), by identifying one or more fingerprints via the use of a touch-pad 34b, through the use of passwords, voice identification (via a microphone, not shown) or other means.

FIG. 3 also illustrates an exemplary motion sequence to indicate that an initiation component has been enacted but, once the attention-getting visual sequence has been displayed, the action is rolled back to allow users to continue interacting with a viewed page 39, absent further visual distractions. In this example, the initiation indication of a desire to turn the page may include an animation in which the virtual page is dragged across a significant portion of the display (i.e., to attract attention) as illustrated in FIG. 1. However, in order to maintain an ability to continue to view images 35a and/or written page content 35b, the initial action sequence (e.g., as shown in FIG. 1) is rolled back to a thin sliver 37 of a page turn that is sufficient to remain a visual indicator of an expressed desire to turn from one page 39 to the next 36, but that does not hide page content 35a, 35b. In this exemplary case, if a completion component consists of swiping a partially turned page completely to the left, the sliver of a turned page 37 is sufficient to be dragged by a user's finger (not shown) to simultaneously signal agreement and enact the completion component.

Figure 4:
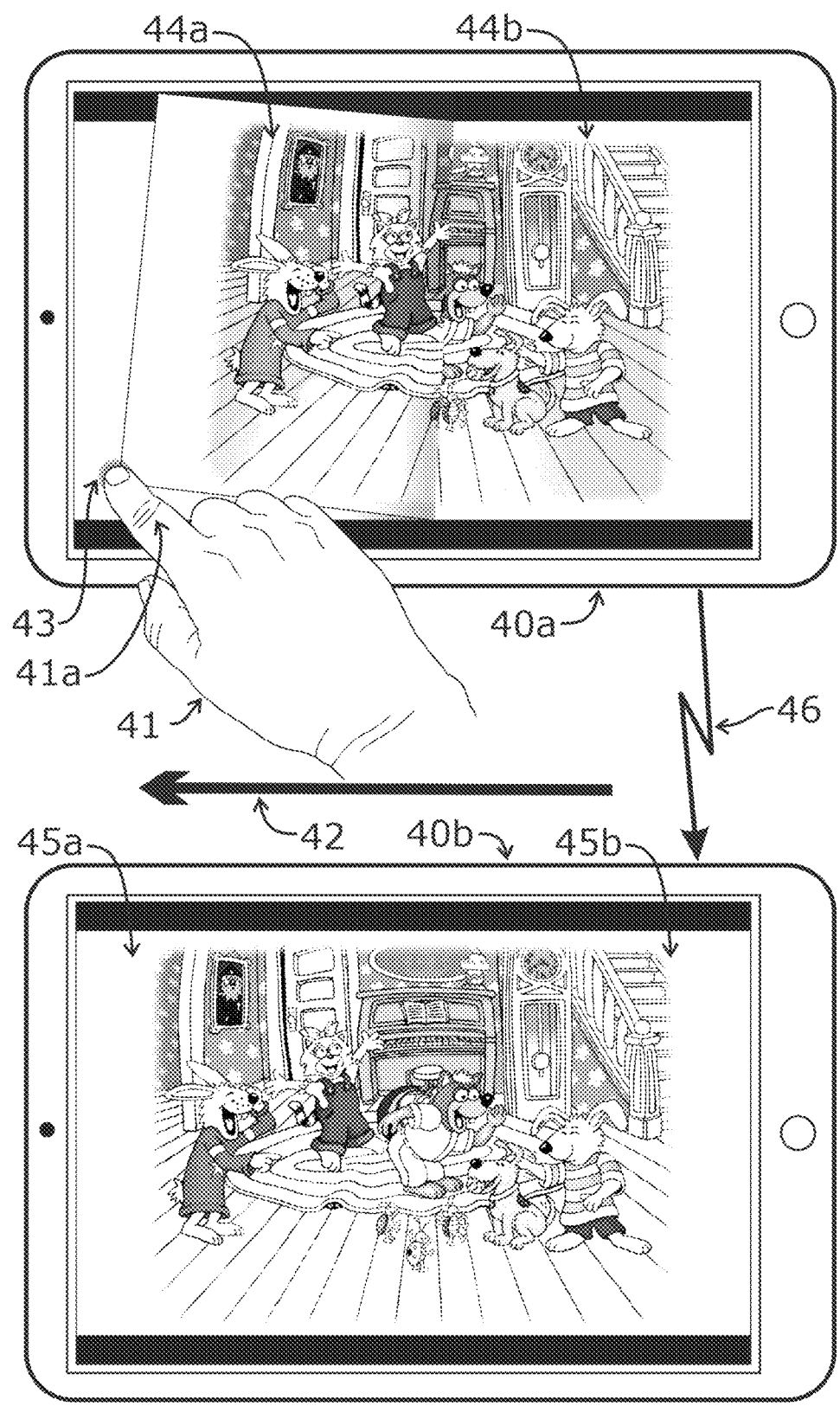
FIG. 4 demonstrates enacting a completion component of a virtual action (i.e., completing the turning of a book page) to signal agreement to complete the virtual action to the initiator and/or to other users.

FIG. 4 shows an exemplary case in which the process of signalling agreement and the completion component are one and the same. Following a page-turn initiation component (e.g., as illustrated in FIG. 1), turning a virtual page 44a completes the virtual action and signals 46 agreement to the initiator and any other shared-experience users. The completion component of the page-turning virtual action (and agreement signal) was enacted on a touch-sensitive display 40a by touching the edge of the virtual page 43 and using an index finger 41a of a right hand 41 to drag the page to the left across the screen 42. As a result of the virtual page turn, new pages 44a, 44b of the virtual book are displayed.

If the number of agreeing indications reaches a threshold number of users and/or if the initiator or another user signals that the completion component should be enacted, then indications to display the newly exposed pages 45a, 45b are transmitted 46 to all devices 40b of shared-experience users (additional devices not shown). As a result, all shared-experience users are on the same page and may continue to interact, including enacting an additional initiation component.

Figure 5:
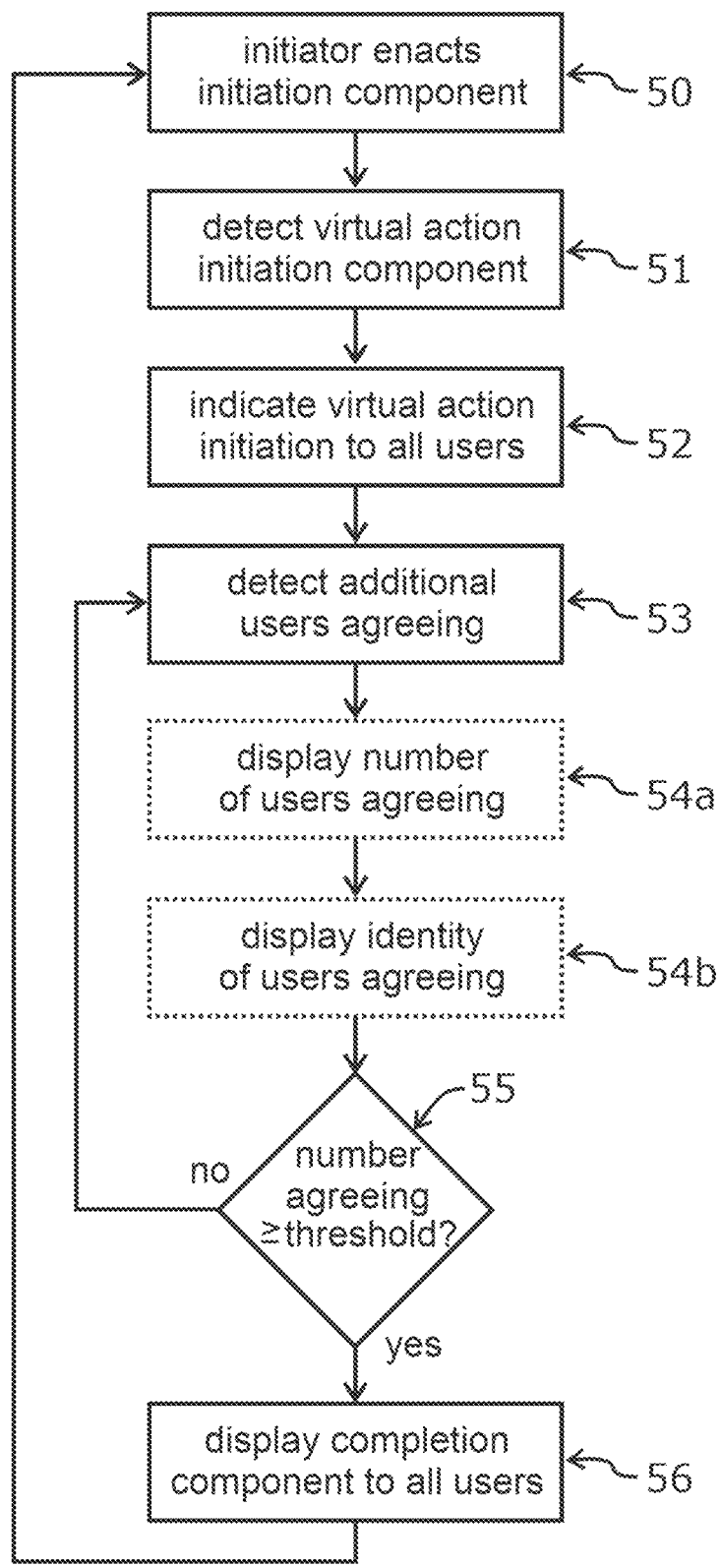
FIG. 5 is a flowchart outlining steps to inform users when the initiation component of a virtual action has been enacted and to subsequently monitor whether agreement reaches a threshold number of users to complete the action for all users.

FIG. 5 is a flowchart outlining steps to notify users of the enacting of an initiation component 50 and to subsequently monitor whether agreement to complete the action reaches a threshold number of users. When an initiation component (enacted by any user) 50 is detected at 51 by the one or more processors involved in generating cooperatively-controlled virtual activities, an indication is sent to devices of all shared-experience users at 52. If subsequently, one or more users signal agreement at 53, then the accumulated number of agreeing users 54a and/or their identities 54b may optionally (i.e., indicated by dashed-line rectangular outlines 54a, 54b) be sent to the initiator of the virtual action, all shared-experience users or a subset of users.

If the number of agreeing users does not reach a predetermined threshold at 55, then all devices continue to monitor whether there is further agreement (returning to 53). However, if the number of agreeing users reaches or exceeds a predetermined threshold number of users at 55, then the completion component of the virtual action is displayed on all user devices at 56. All shared-experience users are thus "synchronized" (in terms of displayed content) and may proceed to continue interacting, including enacting a new initiation component (e.g., restarting at 50).

Figure 6:
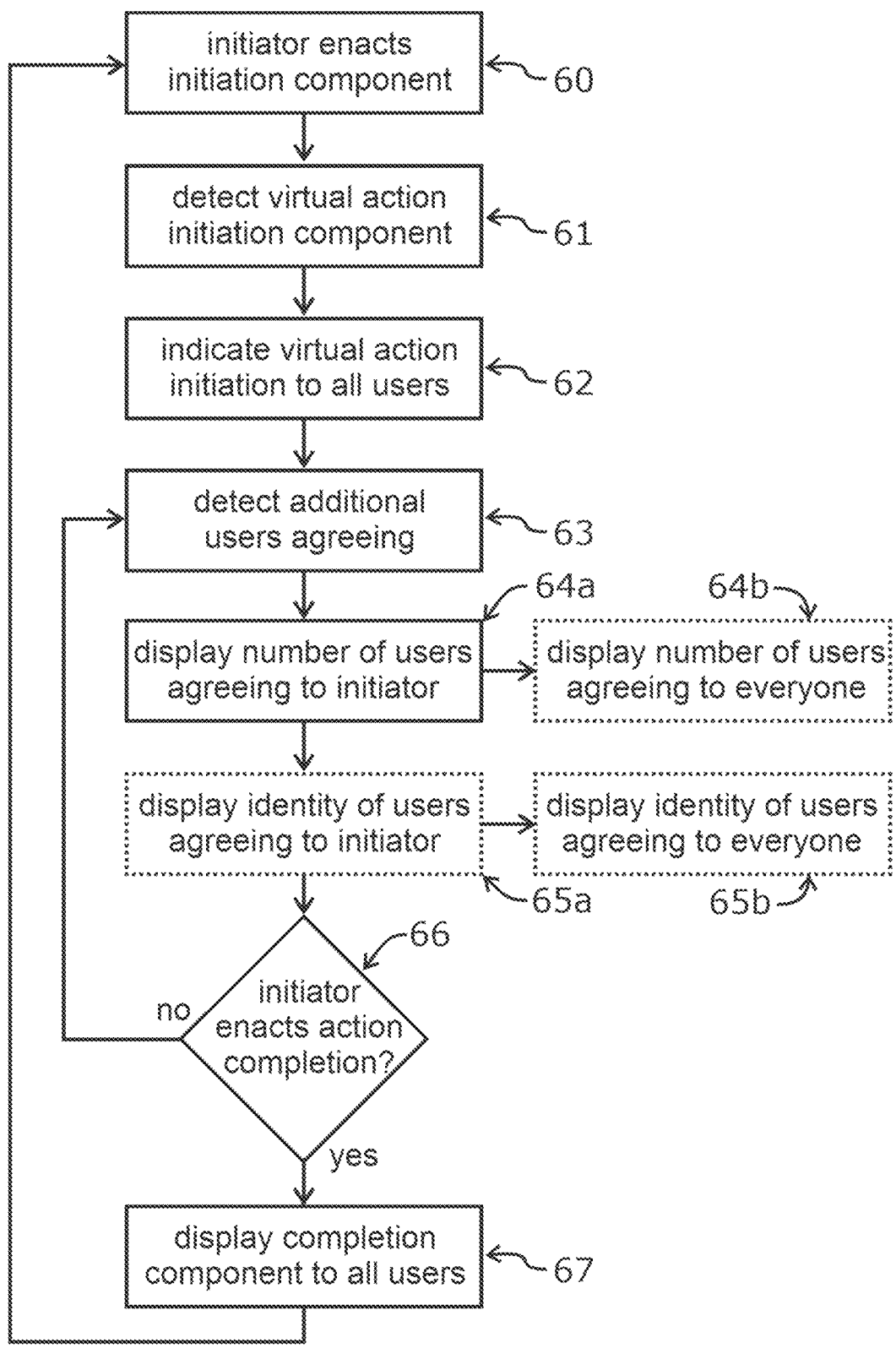
FIG. 6 is a flowchart that outlines steps to signal to users that the initiation component of a virtual action has been launched and to subsequently monitor by the initiator, the degree of agreement to assess when to complete the virtual action for all users.

FIG. 6 is a flowchart outlining steps to inform users that an initiation component has been launched by an initiator 60 and to subsequently monitor agreement among users to complete the action to help determine if and/or when the initiator triggers completion of the virtual action for all users. Upon detecting the virtual action initiation component at 61 by the one or more processors associated with the initiator's interaction device, an indication of the virtual action initiation component is sent to all user devices at 62.

As one or more shared-experience users signal agreement at 63, the number of users agreeing to complete the virtual activity is updated on a display viewed by the initiator at 64a. Optionally, the one or more identities of users (e.g., names, images, avatars) agreeing to complete the virtual action may be revealed to the initiator of the action at 65a. As additional optional elements (indicated by dashed-line rectangular outlines), the number of users agreeing to complete the virtual action 64b and/or their identities 65b may be disclosed to all or a subset of users.

Based on the degree of agreement to complete the virtual action disclosed to the initiator at 64a, 65a, the initiator may decide at 66 to wait until there is further agreement (returning to 63). If the initiator determines that sufficient agreement exists, then an indication may be made by the initiator (e.g., enacting the completion component of the virtual action) to display the completion component of the virtual action to all shared-experience users. As a result, all shared-experience users are "synchronized" and may enact a new initiation component (e.g., restarting at 60).

Figure 7:
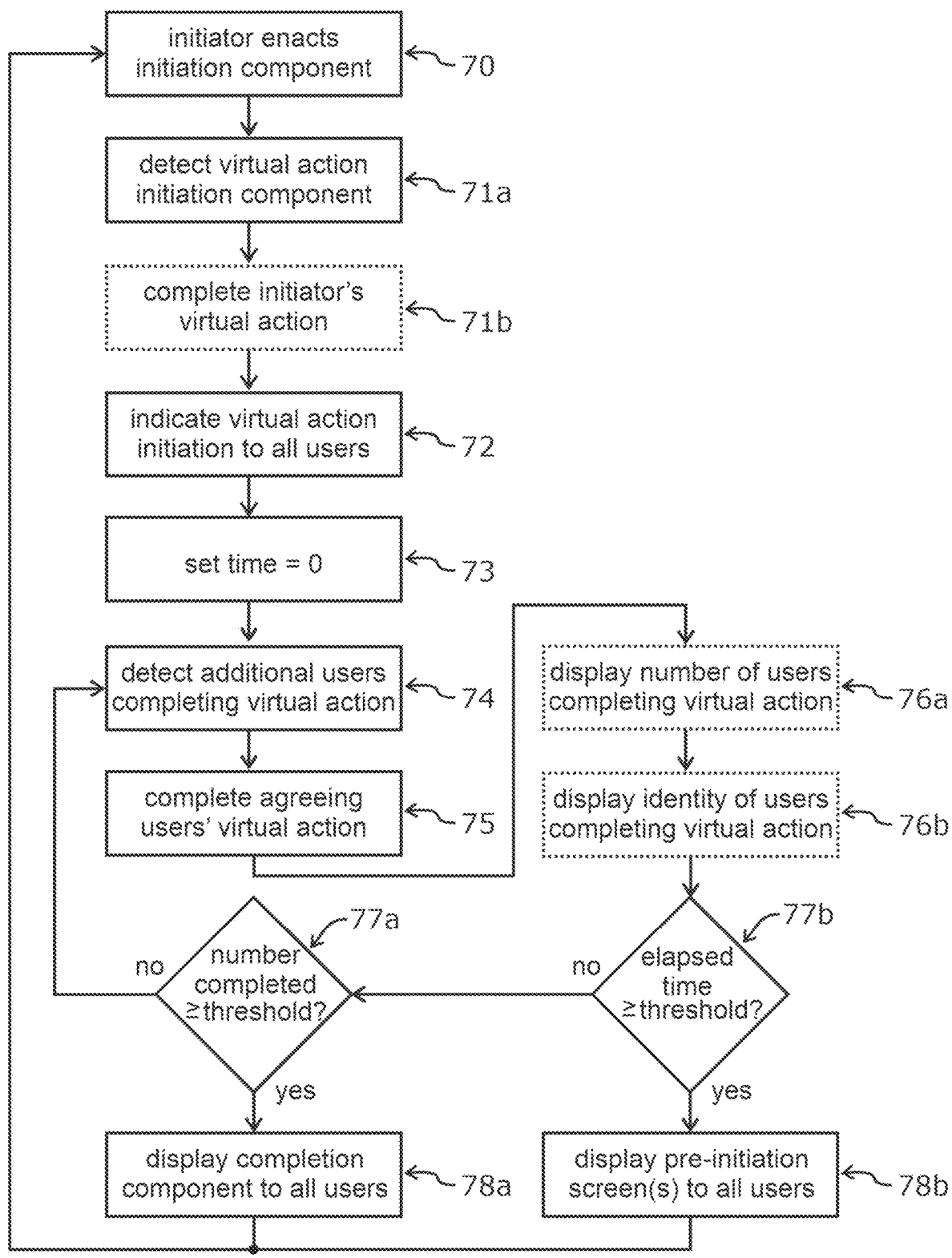
FIG. 7 is a flowchart outlining steps that allow each user to complete a virtual action and to subsequently monitor whether a sufficient number of users complete the action to cause the action to be completed for all users, as well as to monitor whether a threshold time has elapsed (i.e., a timeout condition) to reset virtual activity portions of screens to their contents prior to enacting the initiation component.

FIG. 7 is a flowchart outlining steps in which, following the initiation component of a virtual action by an initiator at 70, each user may complete the virtual action to indicate agreement at 75 and, while viewing results of the completed action, wait for agreement by others to reach a threshold to display the completed action to all at 78a. Steps in this process include detecting the virtual action initiation component at 71a by the one or more processors associated with the initiator. Optionally (i.e., indicated by a dashed-line rectangular outline), the initiator may (immediately) view the completion component of the virtual action at 71b.

An indication of the enacting of the virtual action initiation component is sent to all cooperative-control devices at 72. Enacting the completion component of the virtual action may then be detected at 74 and results viewed immediately on the devices of agreeing users at 75. An accumulated number of users who completed the virtual action 76a and/or their identities 76b may optionally (i.e., indicated by dashed-line rectangular outlines 76a, 76b) be sent to all or a subset of users.

As additionally depicted in FIG. 7, times for shared-experience users to agree to complete a virtual action are monitored. If the time since the initiation component was signalled to users at 72, (i.e., time set to zero at 73) is less than a predetermined threshold time at 77b, then further time may be allowed for signalling interactions at 77a. However, if the elapsed time is greater than a predetermined threshold time at 77b (i.e., a timed-out condition), then portions of all displays devoted to shared-experience virtual activities are reverted to contents shown prior to the initiation of the virtual action at 78b (i.e., without completing the virtual action) and conditions reset to detect a new initiation component at 71a by an initiating user (e.g., restarting at 70).

If the number of agreeing users does not reach a predetermined threshold number of users at 77a, then all shared-experience devices continue to monitor whether more users complete the virtual action at 74. If the number of agreeing users reaches or exceeds a predetermined threshold number of users at 77a, then the completion component of the virtual action is displayed on the devices of all shared-experience users at 78a. At this time, the displays of all shared-experience users are "synchronized" and may continue interacting, including enacting and subsequently detecting 71a a new initiation component (e.g., restarting at 70).

Figure 8:
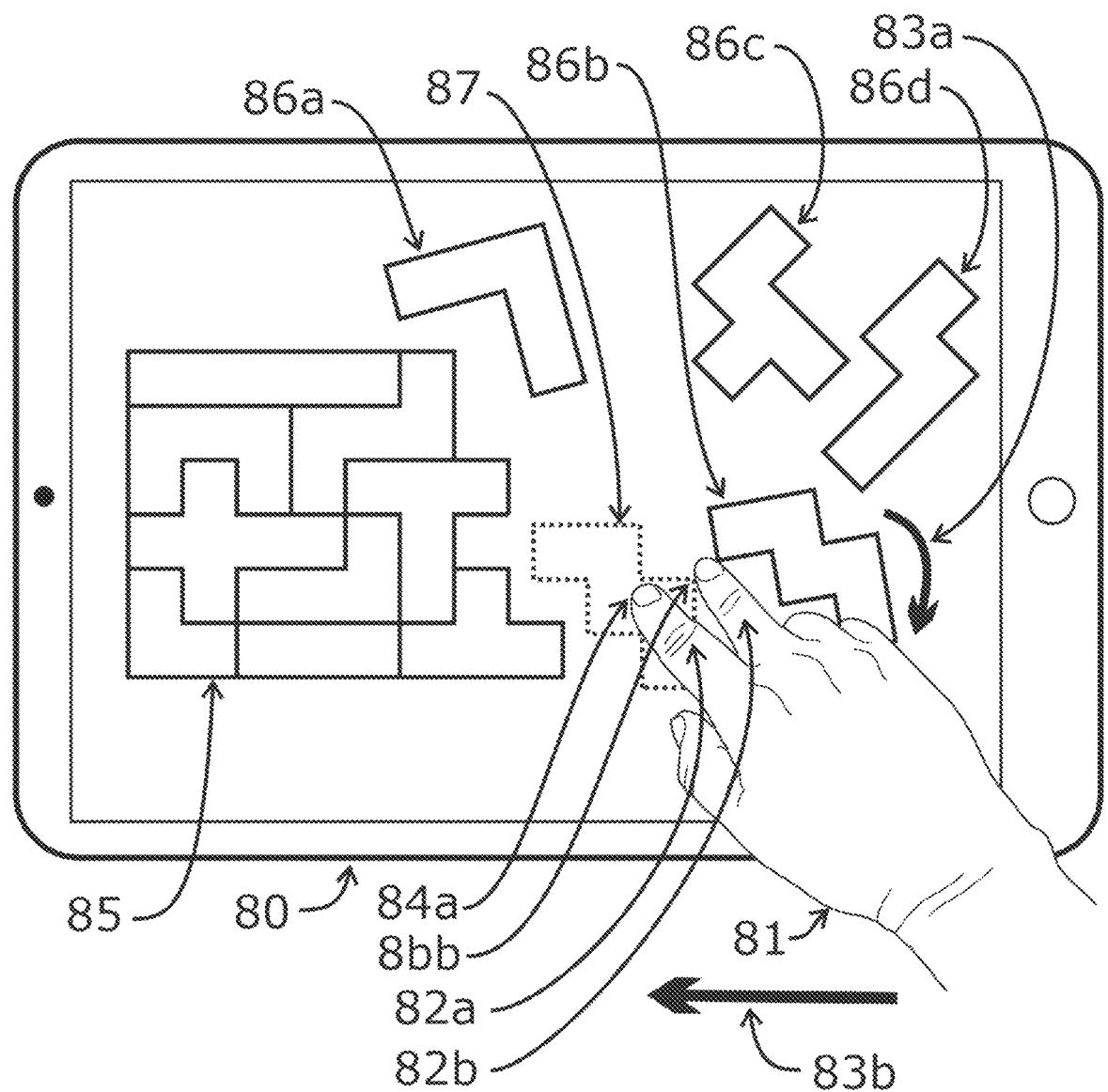
FIG. 8 demonstrates moving a puzzle piece toward a potential destination (i.e., an initiation component) to trigger the querying of other shared-experience users whether the piece will properly fit (i.e., the completion component) during the formation of a newly formed virtual object (i.e., a puzzle).

FIG. 8 illustrates sharing the experience of cooperatively assembling or constructing a virtual object using touch-sensitive displays 80 (additional remote displays not shown). In this example, the target assembled virtual object is a puzzle 85, similar to puzzles composed of wooden or plastic blocks possessing distinctive shapes in the real world. FIG. 8 shows the puzzle in a partially assembled state 85 with four pieces 86a, 86b, 86c, 86d remaining to be assembled. Because remaining blocks 86a, 86b, 86c, 86d are in random orientations, two fingers 82a, 82b of a right hand 81, pointing to corresponding screen locations 84a, 84b may be used to control both the rotational orientation 83a and translation 83b (i.e., horizontal and vertical movements in the plane of the display 80) of the remaining virtual puzzle pieces 86a, 86b, 86c, 86d. Users may move unassembled blocks 86a, 86b, 86c, 86d using their fingers 82a, 82b within blank areas of the display device 80 any number of times during efforts to solve the puzzle (i.e., without triggering an initiation component of a virtual action).

In this exemplary case, an initiation component of a virtual action is signaled by moving a selected remaining block 86b toward a potential target location (represented by dashed lines 87 for block 86b) near the assembled portion of the puzzle 85. This initiation component triggers the querying of one or more shared-experience users whether they agree that the piece will properly fit within the assembled portion of the puzzle 85. The agreeing step of this virtual action may comprise moving the selected block from its location near the target location 87 into the assembled portion of the puzzle 85.

Based on degree of agreement by shared-experience users, the selected block 86b may be incorporated into the puzzle within the display devices of all users. This may arise when a threshold number of users indicate agreement (e.g., by incorporating the selected block 86b into their puzzle 85) or by the initiator completing the virtual action (e.g., while viewing the number and/or identities of those completing the action) of fully incorporating the block 86b into the puzzle 85.

If only two users are involved in the shared puzzle-solving experience, either user may (after any amount of orienting unassembled pieces 86a, 86b, 86c, 86d) simply bring a piece toward the assembled portion of the puzzle to see whether the other user agrees with the initiation component by incorporating the piece into the puzzle (i.e., with results displayed on both devices). No other (repetitive, potentially disrupting) querying about agreement is required during this cooperative activity.

Figure 9:
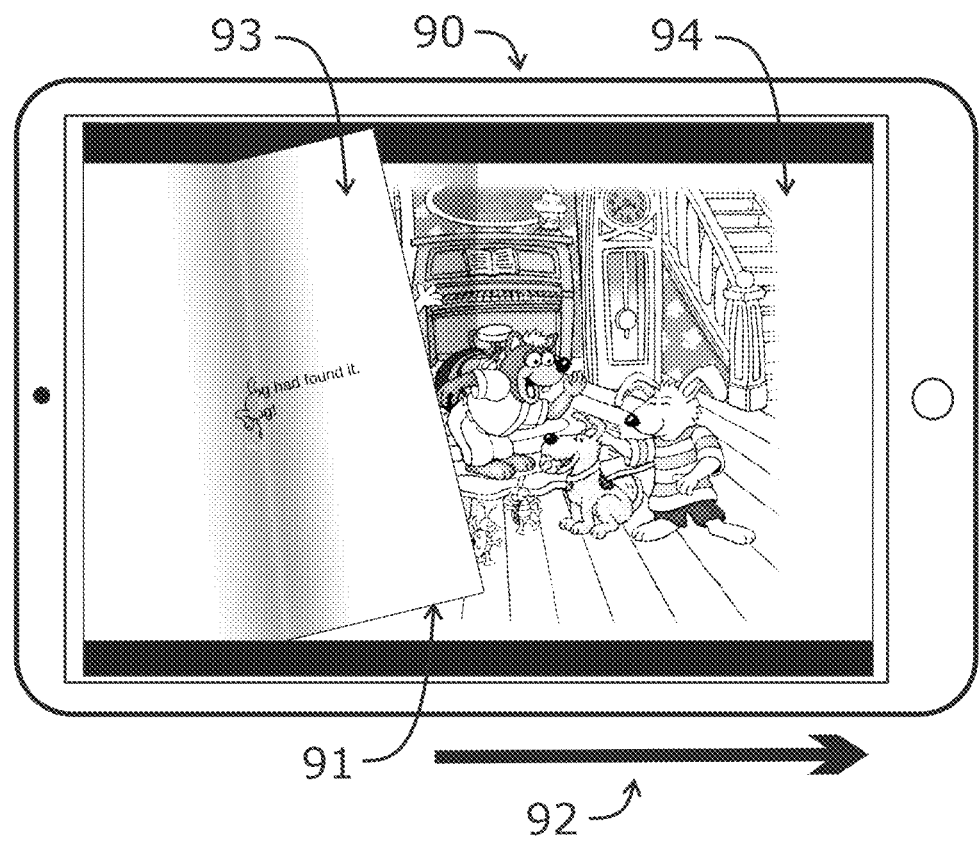
FIG. 9 shows a reversing motion sequence to restore, by the one or more processors, displayed images to contents shown prior to an initiation component during a instance when there is lacking agreement to proceed (e.g., a timeout condition occurs or detecting an indication to block completion of the virtual action).

FIG. 9 illustrates a reversing virtual action 92 on a cooperative-control device 90 (any additional remote displays not shown) that may be executed automatically by the one or more processors involved in generating cooperative virtual activities, as a result of having insufficient agreement among shared-experience users to complete an initiation component (e.g., a threshold elapsed time exceeded) and/or upon identifying a blocking indication by one or more users. The reversing action illustrated in FIG. 9 may, for example, be enacted following the initiation of a page-turning virtual action, such as those shown in FIGS. 1, 2 and 3.

The page-turn reversing action 91 may be executed by rolling 92 the virtual book back to the page that was displayed prior to the initiation component of the virtual action 93. Reversing actions are displayed on all display devices 90 and may (optionally) be designed to attract attention (e.g., involve substantial virtual movement and/or sound or haptic stimuli) as a part of an effort to notify users that a virtual action not been completed and screens may be reset to their status prior to enacting the initiation component. Within some scenarios (e.g., when completion components are displayed to individual users immediately upon signalling agreement), some users may have been able to view (at least temporarily) the turned page 94. After a reversing action, any user may subsequently re-attempt to turn the same page by re-enacting the initiation component, or move on to another activity.

The foregoing disclosure of the examples has been presented for purposes of illustration and description. It is not intended to be exhaustive or to limit the invention to the precise forms disclosed. Many variations and modifications of the examples described herein will be apparent to one of ordinary skill in the art in light of the above disclosure. It will be appreciated that the various components and features described with the particular examples may be added, deleted, and/or substituted with the other examples, depending upon the intended use of the examples.

Further, in describing representative examples, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method for a plurality of humans to cooperatively perform a virtual action that includes an initiation component and a completion component, the method comprising:

providing a plurality of electronic devices, each electronic device comprising one or more processors, an output device operatively coupled to the one or more processors, and a sensor operatively coupled to the one or more processors;

displaying one or more virtual objects simultaneously on the output devices of all of the electronic devices;

after displaying the one or more objects, detecting, by a first sensor of the plurality of electronic devices, the initiation component of the virtual action by a first human, the virtual action including an action involving movement of the one or more virtual objects displayed on the output devices of all of the electronic devices;

displaying, on the output devices of all of the electronic devices, one or more indications of the detecting of the initiation component of the virtual action by the first human, the one or more indications comprising displaying only a portion of the action involving partial movement of the one or more virtual objects on the output devices of all of the electronic devices;

detecting, by one or more additional sensors of the plurality of electronic devices, a number of agreeing indications by one or more humans other than the first human to perform the virtual action;

determining, by the one or more processors, that the number of agreeing indications is greater than or equal to a threshold; and displaying the completion component of the virtual action comprising displaying the action involving completing the movement of the one or more virtual objects simultaneously on the output devices of all of the electronic devices.

2. The method of claim 1, wherein displaying the one or more indications of the detecting of the initiation component of the virtual action includes displaying the portion of the action on the output devices of all of the electronic devices.

3. The method of claim 1, wherein the agreeing indications include one or both of initiating the completion component of the virtual action and completing the completion component of the virtual action.

4. The method of claim 1, further comprising displaying on the output devices of all of the electronic devices one or more of the number of agreeing indications, a fraction of the number of agreeing indications relative to a total number of output devices, one or more images associated with one or more humans who generate agreeing indications, and one or more identities of the one or more humans who generate agreeing indications.

5. The method of claim 1, wherein the threshold is one or more agreeing indications.

6. The method of claim 1, wherein the virtual action comprises one or more of the following presented on all of the output devices: turning a virtual book page, adding a component to a virtual object, removing a component from a virtual object, changing the location of a virtual object, moving to a new viewing location within a virtual environment, adding one or more words to a document, removing one or more words from a document, adding one or more images to a presentation, removing one or more image from a presentation, adding a note to a musical score, removing a note from a musical score, adding an instruction to a set of instructions, and removing an instruction from a set of instructions.

7. The method of claim 1, wherein each electronic device comprises one of a tablet, a mobile phone, a laptop computer, a desktop computer, a smart television, a virtual reality headset, augmented reality contact lenses, augmented reality eye implants and an augmented reality headset.

8. The method of claim 1, wherein the output device is one of a display screen, a touch-sensitive screen, a projection device, a holographic display, a head-up display, an electronic billboard, a television monitor, an augmented reality headset, and a virtual reality headset.

9. The method of claim 1, wherein the sensor is one or more of a touch-sensitive screen, a physical pushbutton, a virtual pushbutton, a projected display incorporating location sensed by finger pointing, and a handheld controller.

10. The method of claim 1, wherein after a predetermined time after detecting the initiation component of the virtual action by the first human, one of the completion component of the virtual action and a restoring image displayed prior to enacting the virtual action by the first human, is displayed on the output devices of all of the electronic devices.

11. A method for a plurality of humans to cooperatively perform a virtual action that includes an initiation component and a completion component, the method comprising:

providing a plurality of electronic devices, each electronic device comprising one or more processors, an output device operatively coupled to the one or more processors, and a sensor operatively coupled to the one or more processors;

displaying one or more virtual objects simultaneously on the output devices of all of the electronic devices;

after displaying the one or more objects, detecting, by a first sensor of the plurality of electronic devices, the initiation component of the virtual action by a first human, the virtual action including an action involving movement of the one or more virtual objects displayed on the output devices of all of the electronic devices;

displaying, on the output devices of all of the electronic devices, one or more indications of the detecting of the initiation component of the virtual action by the first human, the one or more indications comprising displaying only a portion of the movement of the one or more virtual objects towards a completed movement on the output devices of all of the electronic devices;

detecting, by one or more additional sensors of the plurality of electronic devices, a number of agreeing indications by one or more humans other than the first human to perform the virtual action;

displaying, on an output device viewed by the first human, the number of agreeing indications to perform the virtual action;

detecting, by the first sensor, a confirming indication by the first human to complete the virtual action; and displaying the completion component on the output devices of all of the electronic devices, the completion component comprising displaying the action involving displaying the completed movement of the one or more virtual objects simultaneously on the output devices of all of the electronic devices.

12. The method of claim 11, wherein displaying the one or more indications of the detecting of the initiation component of the virtual action includes displaying the portion of the action on the output devices of all of the electronic devices.

13. The method of claim 11, wherein the agreeing indications include one or both of initiating the completion component of the virtual action and completing the completion component of the virtual action.

14. The method of claim 11, further comprising, after detecting the initiation component of the virtual action by the first human, displaying the completion component of the virtual action on the first output device viewed by the first human.

15. The method of claim 11, further comprising displaying on the output devices of all of the electronic devices one or more of the number of agreeing indications, a fraction of the number of agreeing indications relative to a total number of output devices, one or more images associated with one or more humans who generate agreeing indications, and one or more identities of the one or more humans who generate agreeing indications.

16. A method for a plurality of humans to cooperatively perform a virtual action that includes an initiation component and a completion component, the method comprising:

providing a plurality of electronic devices, each electronic device comprising one or more processors, an output device operatively coupled to the one or more processors, and a sensor operatively coupled to the one or more processors;

displaying one or more virtual objects simultaneously on the output devices of all of the electronic devices;

after displaying the one or more objects, detecting, by a first sensor of the plurality of electronic devices, the initiation component of the virtual action by a first human, the virtual action including an action involving movement of the one or more virtual objects displayed on the output devices of all of the electronic devices;

displaying, on output devices of all of the electronic devices, one or more indications of the detecting of the initiation component of the virtual action by the first human, the one or more indications comprising displaying only a portion of the movement of the one or more virtual objects towards a completed movement on the output devices of all of the electronic devices;

detecting, by one or more additional sensors of the plurality of electronic devices, a number of agreeing indications by one or more humans other than the first human to perform the virtual action;

displaying, on agreeing output devices viewed by agreeing humans, the completion component of the virtual action;

determining, by the one or more processors, that the number of agreeing indications is greater than or equal to a threshold; and displaying the completion component on the output devices of all of the electronic devices, the completion component of the virtual action comprising displaying the completed movement involving the one or more virtual objects simultaneously on the output devices of all of the electronic devices.

17. The method of claim 16, wherein indications by the first human to identify one or both of the initiation component and the completion component of the virtual action are detected by the first sensor of the plurality of electronic devices.

18. The method of claim 16, wherein, after a predetermined time after detecting the initiation component of the virtual action by the first human, one of the completion component of the virtual action and a restored image displayed prior to enacting the virtual action by the first human, is displayed on the output devices of all of the electronic devices.

19. The method of claim 16, further comprising, upon detecting, by the one or more sensors of the plurality of electronic devices, a blocking indication, displaying a restored image displayed prior to enacting the virtual action by the first human on the output devices of all of the electronic devices.

20. The method of claim 16, further comprising, upon detecting, by the one or more sensors of the plurality of electronic devices, a forcing indication to perform the virtual action, displaying the completion component of the virtual action on the output devices of all of the electronic devices.

21. A method for a plurality of humans to cooperatively perform a virtual action that includes an initiation component and a completion component, the method comprising:

providing a plurality of electronic devices, each electronic device comprising one or more processors, an output device operatively coupled to the one or more processors, and a sensor operatively coupled to the one or more processors;

displaying one or more virtual objects simultaneously on the output devices of all of the electronic devices;

after displaying the one or more objects, detecting, by a first sensor of the plurality of electronic devices, the initiation component of the virtual action by a first human, the virtual action including an action involving the one or more virtual objects displayed on the output devices of all of the electronic devices;

displaying, on the output devices of all of the electronic devices, one or more indications of the detecting of the initiation component of the virtual action by the first human, the one or more indications comprising displaying a portion of the action involving the one or more virtual objects;

detecting, by one or more additional sensors of the plurality of electronic devices, a number of agreeing indications to perform the virtual action;

determining, by the one or more processors, that the number of agreeing indications is greater than or equal to a threshold; and displaying the completion component of the virtual action comprising displaying the action involving the one or more virtual objects simultaneously on the output devices of all of the electronic devices, wherein displaying one or more virtual objects comprises displaying one or more pages of a virtual book on the output devices of all of the electronic devices, wherein the initiation component comprises displaying a partially turned page simultaneously on the output devices of all of the electronic devices, and wherein the completion component of the virtual action comprises displaying the complete turning a page of the virtual book simultaneously on the output devices of all of the electronic devices.

22. The method of claim 1, wherein the plurality of electronic devices consists of two electronic devices.

23. The method of claim 1, wherein each agreeing indication comprises displaying an additional action involving the one or more virtual objects on the output devices of all of the electronic devices.

24. The method of claim 1, wherein displaying the one or more indications comprises displaying a portion of the complete movement of the one or more virtual objections on the output devices of all of the electronic devices.

25. The method of claim 1, wherein displaying the one or more virtual objects comprises displaying one or more puzzle pieces on the output devices of all of the electronic devices, wherein the initiation component comprises displaying a partial movement of the one or more puzzle pieces on the output devices of all of the electronic devices, and wherein the completion component of the virtual action comprises displaying the complete movement of the one or more puzzle pieces on the output devices of all of the electronic devices.

26. The method of claim 1, wherein displaying the one or more virtual objects comprises displaying a door on the output devices of all of the electronic devices, and wherein the completion component of the virtual action comprises displaying opening the door on the output devices of all of the electronic devices.

* * * * *